United States Patent
Kifune

(10) Patent No.: US 12,315,937 B2
(45) Date of Patent: May 27, 2025

(54) ELECTRODE FOR SECONDARY BATTERY

(71) Applicant: Vehicle Energy Japan Inc., Hitachinaka (JP)

(72) Inventor: Motonari Kifune, Ibaraki (JP)

(73) Assignee: VEHICLE ENERGY JAPAN INC., Ibaraki (JP)

(*) Notice: Subject to any disclaimer, the term of this patent is extended or adjusted under 35 U.S.C. 154(b) by 103 days.

(21) Appl. No.: 17/766,938

(22) PCT Filed: Nov. 24, 2020

(86) PCT No.: PCT/JP2020/043635
§ 371 (c)(1),
(2) Date: Apr. 6, 2022

(87) PCT Pub. No.: WO2021/106860
PCT Pub. Date: Jun. 3, 2021

(65) Prior Publication Data
US 2024/0097141 A1     Mar. 21, 2024

(30) Foreign Application Priority Data
Nov. 27, 2019   (JP) .................. 2019-213861

(51) Int. Cl.
*H01M 4/75* (2006.01)
*H01M 4/139* (2010.01)

(52) U.S. Cl.
CPC ............ *H01M 4/75* (2013.01); *H01M 4/139* (2013.01); *Y10T 29/53135* (2015.01)

(58) Field of Classification Search
CPC .. H01M 4/75; H01M 2004/027; H01M 4/134; Y10T 29/53135
(Continued)

(56) References Cited

U.S. PATENT DOCUMENTS 7,679,739 B2 * 3/2010 Hayashi ............. G01B 11/0683
356/243.4
8,351,054 B2 * 1/2013 Moon .................... G01B 7/003
356/614
(Continued)

FOREIGN PATENT DOCUMENTS

CN    108451501 A    8/2018
CN    107464921 B    4/2019
(Continued)

OTHER PUBLICATIONS

Chinese Office Action issued on Jun. 17, 2023 for Chinese Patent Application No. 202080069309.X.
(Continued)

*Primary Examiner* — Thiem D Phan
(74) *Attorney, Agent, or Firm* — Volpe Koenig

(57) ABSTRACT

The present disclosure provides an electrode for a secondary battery capable of measuring the width of a first mixture layer and the width of a second mixture layer when the first mixture layer and the second mixture layer are stacked and formed on the surface of a metal foil. A positive electrode body (electrode for a secondary battery) includes a strip-like positive electrode foil and a positive electrode mixture layer provided on the positive electrode foil. The positive electrode mixture layer includes a first positive electrode mixture layer provided on the positive electrode foil and a second positive electrode mixture layer provided on the first positive electrode mixture layer. The first positive electrode mixture layer has a width greater than a width of the second positive electrode mixture layer.

3 Claims, 8 Drawing Sheets

(58) Field of Classification Search
USPC ........................................ 29/730, 623.1, 729
See application file for complete search history.

(56) References Cited

U.S. PATENT DOCUMENTS

| | | |
|---|---|---|
| 2002/0028380 A1 | 3/2002 | Tanjo et al. |
| 2014/0377661 A1 | 12/2014 | Lee et al. |
| 2016/0294015 A1 | 10/2016 | Tanaka et al. |
| 2018/0097231 A1 | 4/2018 | Oyama et al. |
| 2020/0067071 A1 | 2/2020 | Ahn et al. |
| 2020/0067074 A1 | 2/2020 | Tuduki et al. |

FOREIGN PATENT DOCUMENTS

| | | |
|---|---|---|
| CN | 109997253 A | 7/2019 |
| CN | 110462885 A | 11/2019 |
| JP | 2002-151055 A | 5/2002 |
| JP | 2005-50755 A | 2/2005 |
| JP | 2007-280687 A | 10/2007 |
| JP | 2010-135272 A | 6/2010 |
| JP | 2012-079566 A | 4/2012 |
| JP | 2015-510249 A | 4/2015 |
| JP | 2017-157529 A | 9/2017 |
| JP | 2018-181539 A | 11/2018 |
| KR | 20140080837 A | 7/2014 |
| WO | 2015/087657 A1 | 6/2015 |
| WO | 2019/093836 A1 | 5/2019 |

OTHER PUBLICATIONS

Chinese Office Action issued on Jan. 18, 2024 for Chinese Patent Application No. 202080069309.X.
Extended European Search Report issued on Dec. 15, 2023 for European Patent Application No. 20892134.6.

* cited by examiner

ELECTRODE FOR SECONDARY BATTERY

TECHNICAL FIELD

The present invention relates to an electrode for a secondary battery having a mixture layer provided on the surface of a metal foil, a secondary battery provided with the same, and a method for manufacturing an electrode for a secondary battery.

BACKGROUND ART

Conventionally, automobile manufactures have developed electric vehicles (EV) and hybrid electric vehicles (HEV) that use an electric motor to assist part of the drive, and as a power source for those vehicles, there is a demand for a high-capacity, high-output secondary battery. As such a secondary battery, there is known a secondary battery including a positive electrode having a positive electrode mixture layer provided on the surface of a positive electrode metal foil and a negative electrode having a negative electrode mixture layer provided on the surface of a negative electrode metal foil. There is also known an electrode for a secondary battery in which a positive electrode mixture layer and a negative electrode mixture layer are each formed by stacking two different types of mixture layers in order to improve the characteristics of the secondary battery (see, for example, Patent Literature 1).

Patent Literature 1 discloses a negative electrode for a lithium ion secondary battery including a current collector foil and a negative electrode mixture layer, in which the negative electrode mixture layer includes a first negative electrode mixture layer and a second negative electrode mixture layer, the first negative electrode mixture layer is disposed on the current collector foil, and the second negative electrode mixture layer is disposed on the first negative electrode mixture layer.

CITATION LIST

Patent Literature

Patent Literature 1: JP 2018-181539 A

SUMMARY OF INVENTION

Technical Problem

By the way, when two mixture layers are stacked and formed on the surface of the metal foil as disclosed in the aforementioned Patent Literature 1, the widths of the two mixture layers may affect the battery characteristics, and thus it is required to entirely inspect the widths of the two mixture layers.

However, when the two mixture layers are stacked and formed on the surface of the metal foil, mixture slurries are usually applied by using coating dies that have the same shape and size. Consequently, a lower (metal-foil side) mixture slurry layer is covered by an upper mixture slurry layer, and after a drying step, a lower (metal-foil side) mixture layer is covered by an upper mixture layer. This makes it difficult to measure the width of the lower mixture layer, and thus it is required to first apply and dry the lower mixture slurry and measure the width of the lower mixture layer, and then apply and dry the upper mixture slurry and measure the width of the upper mixture layer. That is, the width of the lower mixture layer and the width of the upper mixture layer cannot be measured simultaneously. Unfortunately, this makes the manufacturing process more complicated.

The present invention has been made in view of the foregoing, and provides an electrode for a secondary battery, a secondary battery provided with the same, and a method for manufacturing an electrode for a secondary battery capable of measuring the width of a first mixture layer and the width of a second mixture layer simultaneously when the first mixture layer and the second mixture layer are stacked and formed on the surface of a metal foil.

Solution to Problem

In view of the foregoing, the electrode for a secondary battery according to the present invention is an electrode for a secondary battery including a strip-like metal foil and a mixture layer provided on the metal foil, in which the mixture layer includes a first mixture layer provided on the metal foil and a second mixture layer provided on the first mixture layer, and the first mixture layer has a width greater than a width of the second mixture layer.

Advantageous Effects of Invention

According to the present invention, it is possible to provide an electrode for a secondary battery, a secondary battery provided with the same, and a method for manufacturing an electrode for a secondary battery capable of measuring the width of a first mixture layer and the width of a second mixture layer simultaneously when the first mixture layer and the second mixture layer are stacked and formed on the surface of a metal foil.

DESCRIPTION OF EMBODIMENTS

Hereinafter, a secondary battery including an electrode for a secondary battery according to an embodiment of the present invention will be described.

A rectangular secondary battery 20 including a positive electrode body (electrode for a secondary battery) 301 according to one embodiment of the present invention will be described with reference to FIG. 1 to FIG. 3. Herein, an example of applying the rectangular secondary battery 20 to a lithium ion secondary battery will be described.

Figure 1:
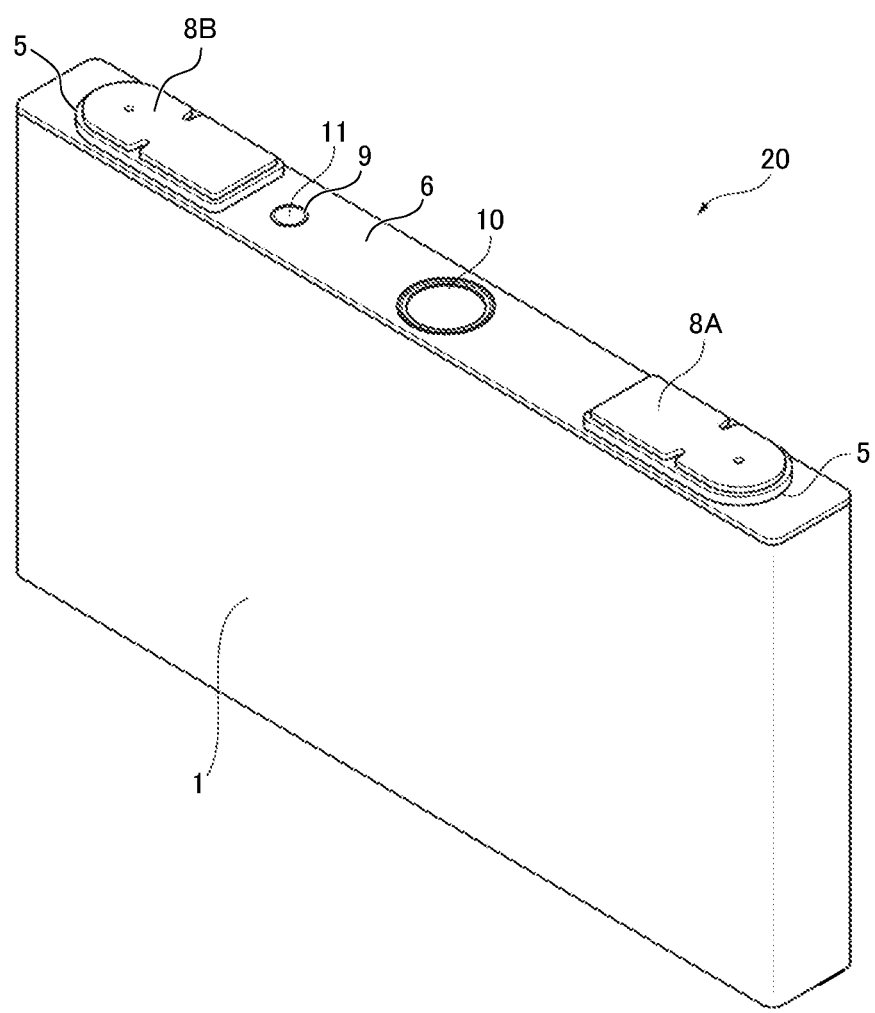
FIG. 1 is an external perspective view of a rectangular secondary battery including a positive electrode body (electrode for a secondary battery) according to one embodiment of the present invention.
Figure 2:
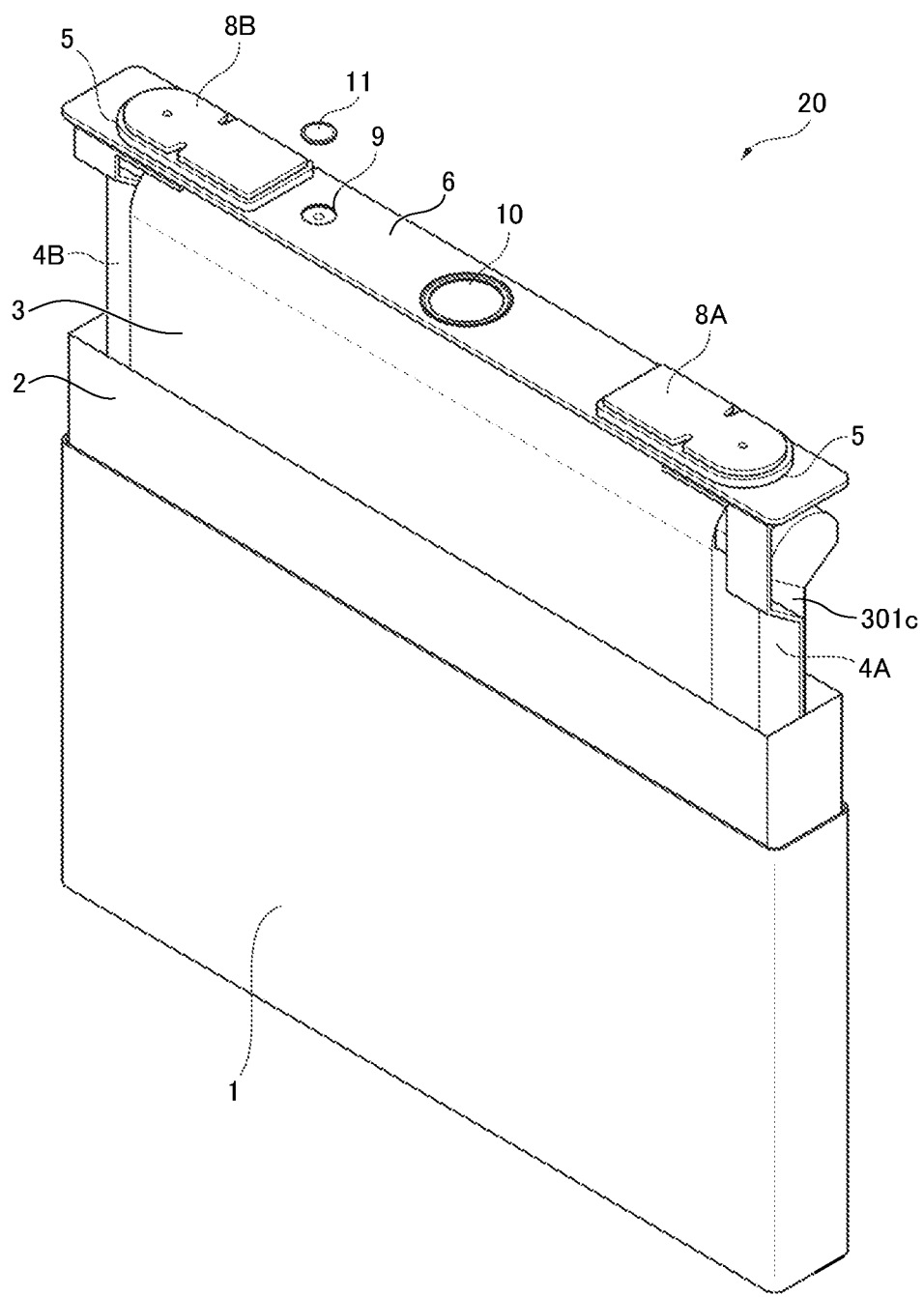
FIG. 2 is an exploded perspective view of a rectangular secondary battery including a positive electrode body according to one embodiment of the present invention.

FIG. 1 is an external perspective view of the rectangular secondary battery 20 including the positive electrode body 301 according to one embodiment of the present invention. FIG. 2 is an exploded perspective view of the rectangular secondary battery 20 including the positive electrode body 301 according to one embodiment of the present invention. FIG. 3 is a perspective view of an electrode group 3 shown in FIG. 2, which is partially expanded. As shown in FIG. 1 and FIG. 2, the rectangular secondary battery 20 includes a battery case 1 and a lid 6. The battery case 1 houses the electrode group 3 serving as a power generator, and the upper opening of the battery case 1 is sealed with the lid 6. The lid 6 is welded to the battery case 1 by laser welding. The battery case 1 and the lid 6 form a battery container.

The lid 6 is provided with a positive electrode external terminal 8A and a negative electrode external terminal 8B. Via the positive electrode external terminal 8A and the negative electrode external terminal 8B, the electrode group 3 is charged, and electric power is supplied to an external load. The lid 6 is provided with a gas discharge valve 10. The gas discharge valve 10 is formed by thinning some portion of the lid 6 through press-forming. When a pressure increases in the battery container, the gas discharge valve 10 cleaves, and gas is discharged from the inside of the battery container to reduce the pressure in the battery container, such that the safety of the rectangular secondary battery 20 is ensured.

In addition, a liquid injection port 9 is formed on the lid 6, and after an electrolyte is injected from the liquid injection port 9 into the battery case 1, a liquid injection plug 11 is welded to the liquid injection port 9, so as to hermetically seal the rectangular secondary battery 20. As the electrolyte, for example, a non-aqueous electrolyte in which a lithium salt, such as lithium hexafluorophosphate ($LiPF_6$), is dissolved in a carbonate ester-based organic solvent, such as ethylene carbonate, may be used.

The battery case 1 of the rectangular secondary battery 20 houses the electrode group 3 via an insulating case 2. The insulating case 2 is made of an insulating resin, such as polypropylene, for example, and electrically insulates the battery case 1 from the electrode group 3.

Figure 3:
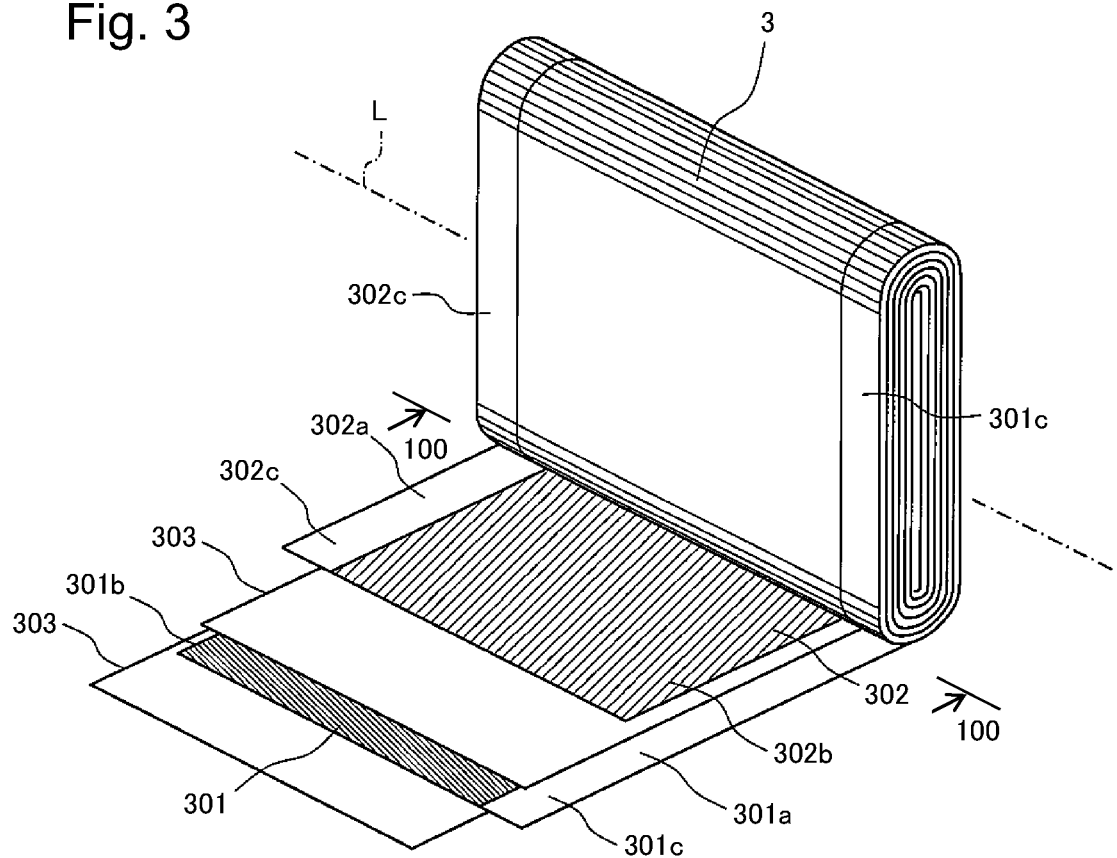
FIG. 3 is a perspective view of the electrode group shown in FIG. 2, which is partially expanded.

As shown in FIG. 3, the electrode group 3 is a wound electrode group in which a positive electrode body (positive electrode) 301 and a negative electrode body (negative electrode) 302 are wound about a winding axis L in a flat shape with a separator 303 interposed therebetween. The electrode group 3 includes a positive electrode foil-exposed portion 301c and a negative electrode foil-exposed portion 302c serving as metal-foil-exposed portions (described later), which are at least partially formed in a flat plate shape, as shown in FIG. 2. Then, the flat-shaped portions of the positive electrode foil-exposed portion 301c and the negative electrode foil-exposed portion 302c are respectively overlaid with and connected to one end of a positive electrode collector plate 4A and one end of a negative electrode collector plate 4B by welding or the like. It should be noted that FIG. 3 shows a state of the electrode group 3 before the metal-foil-exposed portions (the positive electrode foil-exposed portion 301c, the negative electrode foil-exposed portion 302c) of the positive electrode body 301 and the negative electrode body 302 are formed in a flat plate shape and bonded to the positive electrode collector plate 4A and the negative electrode collector plate 4B. The electrode group 3 is inserted into the battery case 1 such that the winding axis L direction of the electrode group 3 is along the longitudinal direction of the battery case 1.

The other end (upper end) of the positive electrode collector plate 4A and the other end (upper end) of the negative electrode collector plate 4B are electrically connected to the positive electrode external terminal 8A and the negative electrode external terminal 8B, respectively. It should be noted that gaskets 5 are interposed between the positive electrode external terminal 8A and negative electrode external terminal 8B and the lid 6, and insulating plates (not shown) are interposed between the positive electrode collector plate 4A and negative electrode collector plate 4B and the lid 6. The gaskets 5 and the insulating plates (not shown) electrically insulate the positive electrode external terminal 8A and negative electrode external terminal 8B and the positive electrode collector plate 4A and negative electrode collector plate 4B, from the lid 6, respectively.

The battery case 1, the lid 6, the positive electrode collector plate 4A, and the positive electrode external terminal 8A are made of aluminum or an aluminum alloy, and the negative electrode collector plate 4B and the negative electrode external terminal 8B are made of copper or a copper alloy.

As shown in FIG. 3, the electrode group 3 is formed by winding in a flat shape the positive electrode body 301 and the negative electrode body 302 about the winding axis L with the separator 303 interposed therebetween. Here, the positive electrode body 301 includes a positive electrode foil (metal foil) 301a made of an aluminum foil and positive electrode mixture layers 301b formed on opposite surfaces of the positive electrode foil 301a. The end portion of the positive electrode foil 301a on one side in the width direction (winding axis L direction) includes the positive electrode foil-exposed portion 301c on which the positive electrode mixture layers 301b are not provided and the positive electrode foil 301a is exposed. The negative electrode body 302 includes a negative electrode foil 302a made of a copper foil and negative electrode mixture layers 302b formed on opposite surfaces of the negative electrode foil 302a. The end portion of the negative electrode foil 302a on the other side in the width direction (winding axis L direction) includes the negative electrode foil-exposed portion 302c on which the negative electrode mixture layers 302b are not provided and the negative electrode foil 302a is exposed. The positive electrode body 301 and the negative electrode body 302 are wound about the winding axis L such that the positive electrode foil-exposed portion 301c and the negative electrode foil-exposed portion 302c are disposed on the opposite sides to each other in the winding axis L direction.

Figure 4:
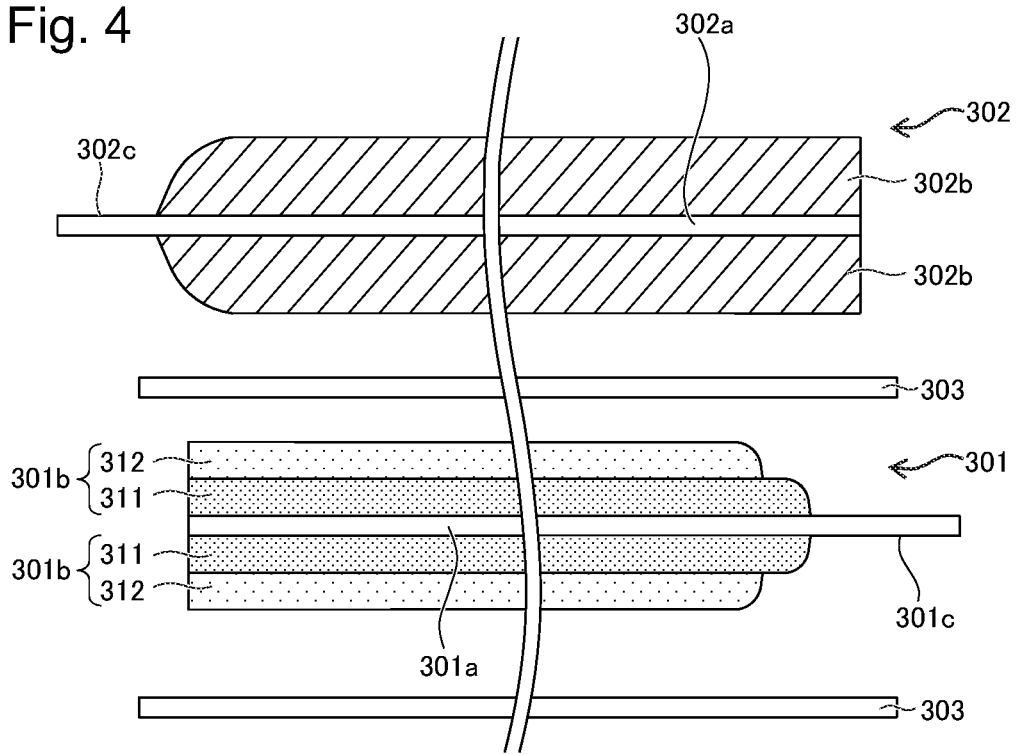
FIG. 4 is a cross-sectional view taken along line 100-100 of FIG. 3.

Here, in the present embodiment, each positive electrode mixture layer 301b includes a first positive electrode mixture layer (first mixture layer) 311 formed on the positive electrode foil 301a and a second positive electrode mixture layer (second mixture layer) 312 formed on the first positive electrode mixture layer 311 as shown in FIG. 4. The first positive electrode mixture layer 311 and the second positive electrode mixture layer 312 are configured to have characteristics that are different from each other. Examples of the characteristics that are different from each other may include, but are not particularly limited to, an electrical conductivity, a porosity, and the like. In the thickness direction of the positive electrode mixture layer 301b, usually the reaction of a positive electrode active material is the largest around the surface of the second positive electrode mixture layer 312 and the reactivity of the positive electrode active material decreases as the distance from the surface of the positive electrode mixture layer 301b increases (toward the inner part of the positive electrode mixture layer 301b). Here, if the electrical conductivity of the first positive electrode mixture layer 311 is higher than the electrical conductivity of the second positive electrode mixture layer 312, for example, the reactivity of the positive electrode active material increases also in the inner part of the positive electrode mixture layer 301b, thus allowing the positive electrode active material to react more uniformly in the thickness direction of the positive electrode mixture layer 301b. As a result, it is possible to suppress deterioration of the positive electrode active material of the second positive electrode mixture layer 312 and extend the life of the rectangular secondary battery 20. In addition, if the porosity of the second positive electrode mixture layer 312 is high, for example, the liquid retention capability for an electrolyte can be improved.

In the present embodiment, the first positive electrode mixture layer 311 has a higher electrical conductivity as compared to the second positive electrode mixture layer 312. In addition, the difference between the L* value of the first positive electrode mixture layer 311 and the L* value of the second positive electrode mixture layer 312 is 4 or larger in the L*a*b* color system defined by the International Commission on Illumination (CIE). Further, the first positive electrode mixture layer 311 has a smaller L* value in the L*a*b* color system as compared to the second positive electrode mixture layer 312. That is, the first positive electrode mixture layer 311 has a higher black color level as compared to the second positive electrode mixture layer 312. The reason why the first positive electrode mixture layer 311 has a higher electrical conductivity and a higher black color level as compared to the second positive electrode mixture layer 312 will be described later.

Figure 5:
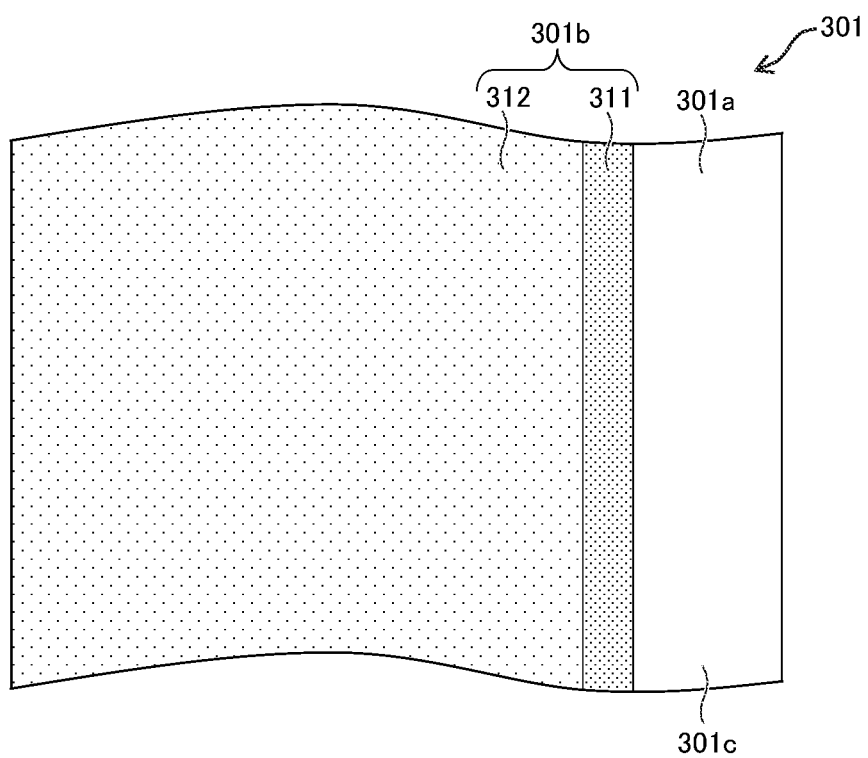
FIG. 5 is a plan view of a positive electrode body according to one embodiment of the present invention.

In addition, in the present embodiment, the width of the first positive electrode mixture layer 311 is greater than that of the second positive electrode mixture layer 312 as shown in FIG. 4 and FIG. 5. Specifically, the end portion of the first positive electrode mixture layer 311 on the one side in the width direction is formed so as to project beyond the second positive electrode mixture layer 312 toward the one side in the width direction. On the other hand, the end portion of the first positive electrode mixture layer 311 on the other side in the width direction is formed so as to be flush with the end portions of the second positive electrode mixture layer 312 and the positive electrode foil 301a on the other side in the width direction. This means that the width of the first positive electrode mixture layer 311 is equal to the distance from the end portion of the first positive electrode mixture layer 311 on the one side to the end portion of the second positive electrode mixture layer 312 on the other side. Thus, the width of the first positive electrode mixture layer 311 can be measured from above the second positive electrode mixture layer 312 (in the thickness direction of the positive electrode body 301).

In addition, in the present embodiment, since the surface of the end portion of the first positive electrode mixture layer 311 on the one side is not covered by the second positive electrode mixture layer 312, the first positive electrode mixture layer 311 contacts an electrolyte in the end portion of the first positive electrode mixture layer 311 on the one side. At this time, in the end portion of the first positive electrode mixture layer 311 on the one side, the reaction of the positive electrode active material is the largest around the surface of the first positive electrode mixture layer 311 in the thickness direction of the first positive electrode mixture layer 311 and the reactivity of the positive electrode active material decreases as the distance from the surface of the first positive electrode mixture layer 311 increases (toward the inner part of the first positive electrode mixture layer 311). Here, since the first positive electrode mixture layer 311 has a relatively high content of carbon particles and high electrical conductivity (for example, as compared to the second positive electrode mixture layer 312), which will be described later, the reactivity of the positive electrode active material is relatively high also in the inner part of the first positive electrode mixture layer 311. This allows the positive electrode active material to react more uniformly in the thickness direction of the first positive electrode mixture layer 311, and thus can suppress deterioration of the positive electrode active material of the first positive electrode mixture layer 311. In this way, it is possible to suppress deterioration of the positive electrode active material in the exposed area (area not covered by the second positive electrode mixture layer 312) of the first positive electrode mixture layer 311.

In addition, in the present embodiment, the first positive electrode mixture layer 311 and the second positive electrode mixture layer 312 contain carbon particles as a conductive material, and the average particle diameter of the carbon particles of the first positive electrode mixture layer 311 may be smaller than the average particle diameter of the carbon particles of the second positive electrode mixture layer 312, as will be described later. Such a configuration increases the specific surface area of the carbon particles of the first positive electrode mixture layer 311, and thus increases the contact area between the carbon particles and the positive electrode active material and allows efficient electron transfer between the carbon particles and the positive electrode active material. In this way, while suppressing deterioration of the positive electrode active material in the exposed area of the first positive electrode mixture layer 311, it is possible to allow efficient electron transfer between the carbon particles and the positive electrode active material.

Next, a method for manufacturing the rectangular secondary battery 20 of the present embodiment will be described.

The method for manufacturing the rectangular secondary battery 20 of the present embodiment includes the step of preparing the positive electrode body 301 and the step of preparing the negative electrode body 302. For the other steps of the method for manufacturing the rectangular secondary battery 20 of the present embodiment, a known manufacturing method can be used. Thus, the description thereof will be omitted herein.

Figure 6:
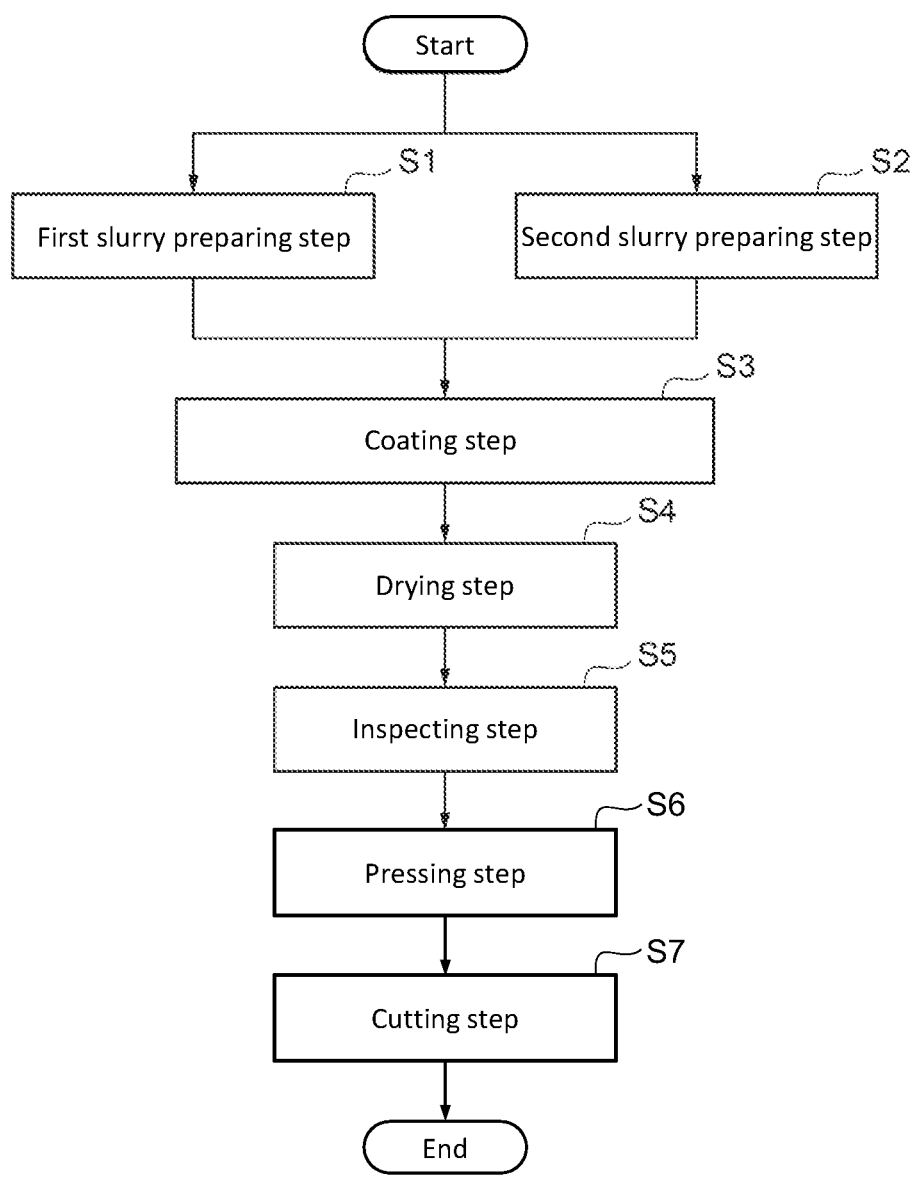
FIG. 6 is a flow chart showing one example of the step of preparing a positive electrode body according to one embodiment of the present invention.

As shown in FIG. 6, the step of preparing the positive electrode body 301 includes a first slurry preparing step S1, a second slurry preparing step S2, a coating step S3, a drying step S4, an inspecting step S5, a pressing step S6, and a cutting step S7.

In the first slurry preparing step S1, a first positive electrode mixture slurry (first mixture slurry) 311a, which will form the first positive electrode mixture layer 311, is prepared by a positive electrode active material, carbon particles as a conductive material, a binder, and a dispersing solvent for dispersing the positive electrode active material and the carbon particles. Although the materials of the positive electrode active material, the carbon particles, the binder, and the dispersing solvent are not particularly limited, for example, 1 to 10 parts by weight of scaly graphite (carbon particles) as a first conductive material, 1 to 10 parts by weight of powdered carbon particles as a second conductive material, and 1 to 10 parts by weight of polyvinylidene fluoride (hereinafter referred to as PVDF) as a binder are added to 100 parts by weight of lithium nickel manganese oxide as a positive electrode active material, and then N-methylpyrrolidone (hereinafter referred to as NMP) as a dispersing solvent is further added thereto and kneaded to prepare the first positive electrode mixture slurry 311a.

It should be noted that examples of the powdered carbon particles may include a carbon black, such as acetylene black, ketjen black, or the like. The average particle diameter of graphite used as the first conductive material is 1 μm to 50 μm, and the average particle diameter of carbon black used as the second conductive material is 1 nm to 500 nm. Further, for the positive electrode active material, other than the lithium nickel manganese oxide, a different lithium manganese oxide having a spinel crystal structure, a lithium manganese composite oxide in which the lithium manganese oxide is partially substituted by or doped with a metal element, a lithium cobaltite or a lithium titanate having a layered crystal structure, or a lithium-metal composite oxide in which the lithium cobaltite or lithium titanate is partially substituted by or doped with a metal element, or the like may be used.

The second slurry preparing step S2 may be performed in parallel with the first slurry preparing step S1, for example. In the second slurry preparing step S2, a second positive electrode mixture slurry (second mixture slurry) 312a, which will form the second positive electrode mixture layer 312, is prepared by a positive electrode active material, carbon particles as a conductive material, a binder, and a dispersing solvent for dispersing the positive electrode active material and the carbon particles. Examples of the materials of the positive electrode active material, the carbon particles, the binder, and the dispersing solvent may include, but are not particularly limited to, the same materials as those of the first positive electrode mixture slurry 311a.

Here, in the present embodiment, the first positive electrode mixture slurry 311a has a higher content of carbon particles as the second conductive material as compared to the second positive electrode mixture slurry 312a. Since the carbon particles as the second conductive material are black, the first positive electrode mixture slurry 311a containing a large amount of carbon particles has a smaller L* value in the L*a*b* color system as compared to the second positive electrode mixture slurry 312a. That is, the first positive electrode mixture slurry 311a appears dark (black) as compared to the second positive electrode mixture slurry 312a. As described above, the content of carbon particles of the first positive electrode mixture layer 311 may be, for example, at least 4% by weight higher than the content of carbon particles of the second positive electrode mixture layer 312 so that the L* value of the first positive electrode mixture layer 311 is smaller than the L* value of the second positive electrode mixture layer 312 by 4 or larger. In addition, since the first positive electrode mixture layer 311 has a higher content of carbon particles as compared to the second positive electrode mixture layer 312, the first positive electrode mixture layer 311 has a higher electrical conductivity as compared to the second positive electrode mixture layer 312. As described above, this allows the positive electrode active material to react more uniformly in the thickness direction of the positive electrode mixture layer 301b, and thus can suppress deterioration of the positive electrode active material of the positive electrode mixture layer 301b.

Furthermore, when the first positive electrode mixture slurry 311a is configured to appear darker (black) as compared to the second positive electrode mixture slurry 312a, the average particle diameter of carbon particles of the first positive electrode mixture slurry 311a may be smaller than the average particle diameter of carbon particles of the second positive electrode mixture slurry 312a. As the particle diameter of carbon particles decreases, the specific surface area increases and the amount of light absorption increases. Consequently, the mixture layer appears darker (black).

Figure 7:
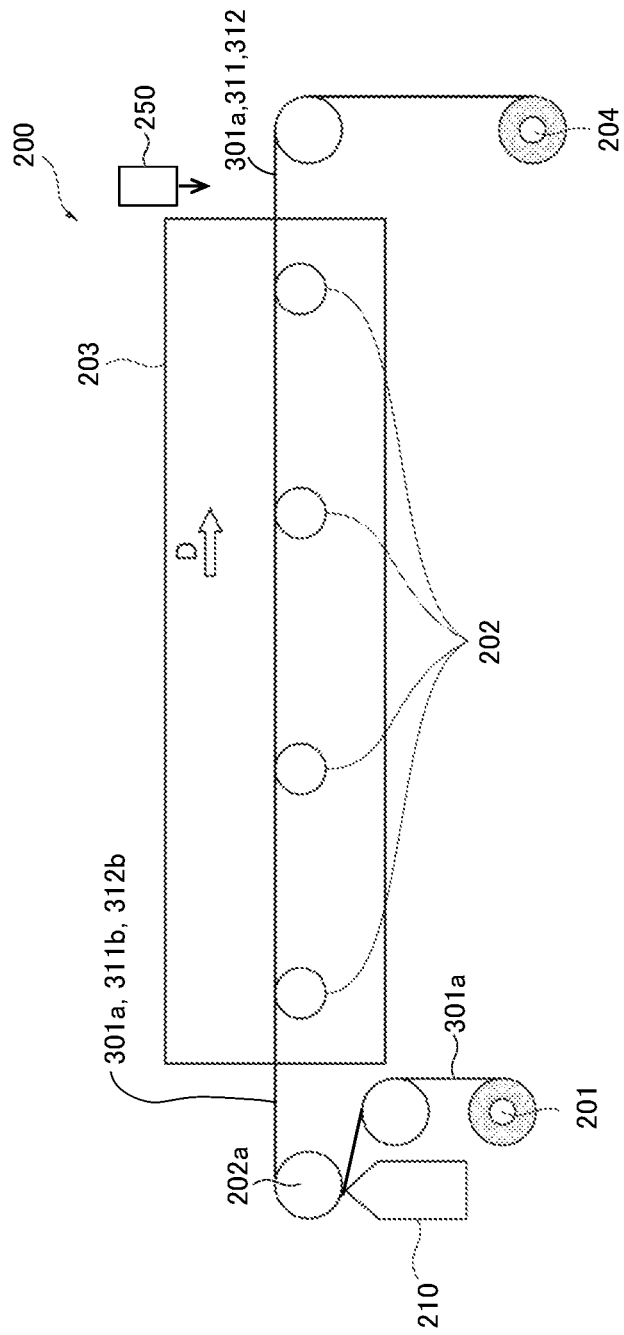
FIG. 7 is a schematic configuration view of a coating/drying apparatus that is used in a coating step S3, a drying step S4, and an inspecting step S5.

The coating step S3, the drying step S4, and the inspecting step S5 are performed by using a coating/drying apparatus 200 shown in FIG. 7. The coating/drying apparatus 200 includes a feed roller 201, a plurality of conveying rollers 202, a die head 210, a drying furnace 203, an inspecting device 250, and a winding roller 204.

The feed roller 201 is configured to support and rotate the roll of the positive electrode foil 301a so as to unwind the roll and feed the strip-like positive electrode foil 301a from the roll. The plurality of conveying rollers 202 is disposed along a conveying path of the positive electrode foil 301a to convey the positive electrode foil 301a fed from the feed roller 201 to the winding roller 204. The die head 210 is disposed to face a back roller 202a among the conveying rollers 202 and is disposed with a predetermined distance from the positive electrode foil 301a. The die head 210 is used to coat the positive electrode foil 301a with a slurry. The drying furnace 203 is disposed downstream of the die head 210 in the conveying direction (arrow D direction). The inside of the drying furnace 203 is set to a predetermined temperature to heat and dry the slurry on the positive electrode foil 301a. The inspecting device 250 is disposed downstream of the drying furnace 203 in the conveying direction. The inspecting device 250 is configured to measure the width of the first positive electrode mixture layer 311 and the width of the second positive electrode mixture layer 312 on the positive electrode foil 301a.

Figure 8:
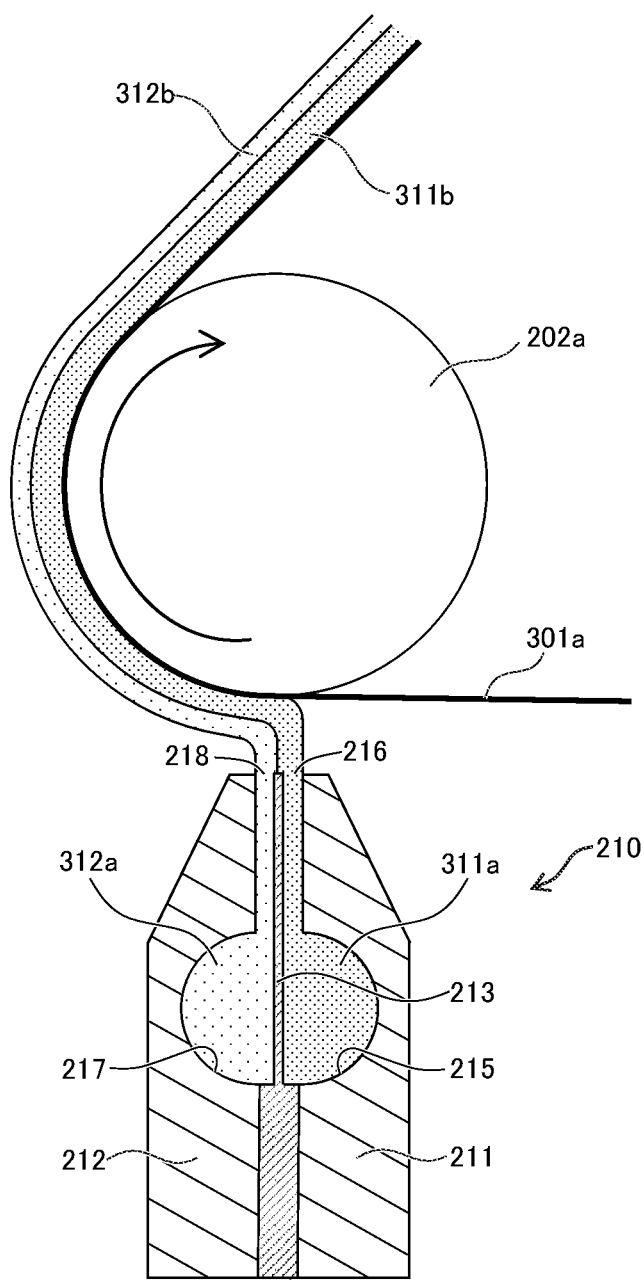
FIG. 8 shows a structure around a die head of the coating/drying apparatus.
Figure 9:
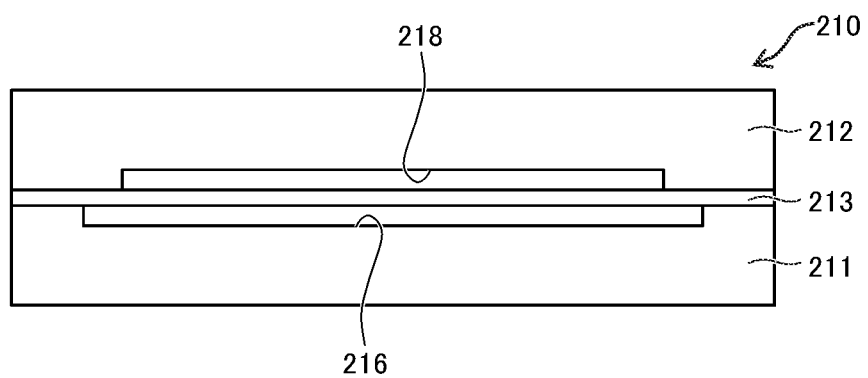
FIG. 9 shows a structure of a die head of the coating/drying apparatus.

In the coating step S3, the first positive electrode mixture slurry 311a and the second positive electrode mixture slurry 312a in a stacked state are applied over the positive electrode foil 301a by using the die head 210. In the present embodiment, as shown in FIG. 8 and FIG. 9, the die head 210 is configured such that the first positive electrode mixture slurry 311a and the second positive electrode mixture slurry 312a can be applied simultaneously. Specifically, the die head 210 includes a first block 211, a second block 212, and a shim 213 sandwiched between the first block 211 and the second block 212.

A first supply portion 215 to which the first positive electrode mixture slurry 311a is supplied from a supply device (not shown) and a first ejection port 216 communicating with the first supply portion 215 to eject the first positive electrode mixture slurry 311a are provided between the first block 211 and the shim 213. A second supply portion 217 to which the second positive electrode mixture slurry 312a is supplied from a supply device (not shown) and a second ejection port 218 communicating with the second supply portion 217 to eject the second positive electrode mixture slurry 312a are provided between the second block 212 and the shim 213. The first ejection port 216 and the second ejection port 218 extend in the width direction of the positive electrode foil 301a.

The first positive electrode mixture slurry 311a and the second positive electrode mixture slurry 312a are ejected from the first ejection port 216 and the second ejection port 218, respectively, and applied over the positive electrode foil 301a in a state where the first positive electrode mixture slurry 311a and the second positive electrode mixture slurry 312a are overlaid with each other. At this time, a first positive electrode mixture slurry layer (first mixture slurry layer) 311b is formed on the positive electrode foil 301a and a second positive electrode mixture slurry layer (second mixture slurry layer) 312b is formed on the first positive electrode mixture slurry layer 311b. The first positive electrode mixture slurry layer 311b is formed to have a thickness of 25 μm to 50 μm, for example, and the second positive electrode mixture slurry layer 312b is formed to have a thickness of 25 μm to 50 μm, for example.

Figure 10:
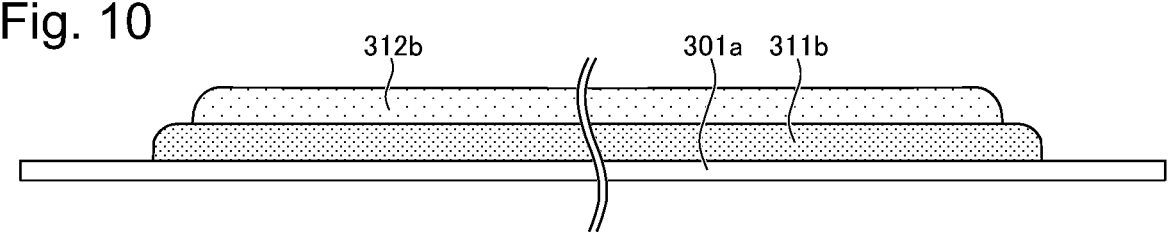
FIG. 10 is a cross-sectional view schematically showing the state where a first positive electrode mixture slurry layer and a second positive electrode mixture slurry layer are formed on a positive electrode foil.

Here, since the width of the second ejection port 218 is less than the width of the first ejection port 216, the second positive electrode mixture slurry layer 312b is formed such that the width of the second positive electrode mixture slurry layer 312b is less than the width of the first positive electrode mixture slurry layer 311b. It should be noted that the first ejection port 216 and the second ejection port 218 are disposed such that their center lines in the width direction correspond to each other. Thus, as shown in FIG. 10, the opposite ends of the first positive electrode mixture slurry layer 311b in the width direction are formed so as to project outward beyond the opposite ends of the second positive electrode mixture slurry layer 312b in the width direction. For example, the width of the second positive electrode mixture slurry layer 312b is at least 1 mm less than the width of the first positive electrode mixture slurry layer 311b. Then, the end portion of the first positive electrode mixture slurry layer 311b in the width direction is formed so as to project 0.5 mm outward beyond the end portion of the second positive electrode mixture slurry layer 312b in the width direction. With such a configuration, it is possible to surely detect the end portion of the first positive electrode mixture layer 311 and the end portion of the second positive electrode mixture layer 312 in the inspecting step S5, which will be described later.

In the drying step S4, the positive electrode foil 301a, the first positive electrode mixture slurry layer 311b, and the second positive electrode mixture slurry layer 312b pass through the inside of the drying furnace 203, whereby the first positive electrode mixture slurry layer 311b and the second positive electrode mixture slurry layer 312b are heated and dried to form the first positive electrode mixture layer 311 and the second positive electrode mixture layer 312. At this time, the content of carbon particles of the first positive electrode mixture layer 311 may be 10 to 15% by mass, and the content of carbon particles of the second positive electrode mixture layer 312 may be 6 to 10% by mass. In this case, the L* value of the first positive electrode mixture layer 311 can be smaller than the L* value of the second positive electrode mixture layer 312 by 4 or larger while allowing the positive electrode mixture layer 301b of the positive electrode body 301 to exhibit its required performance.

Figure 11:
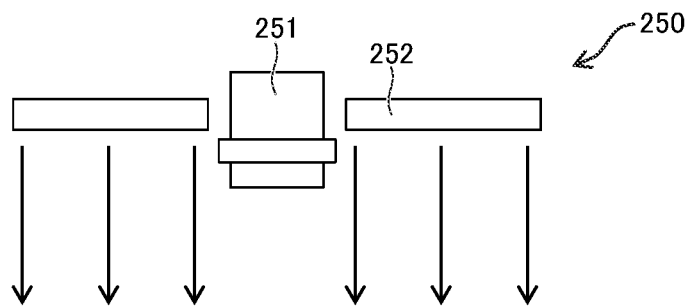
FIG. 11 is a schematic view around an inspecting device.
Figure 11:
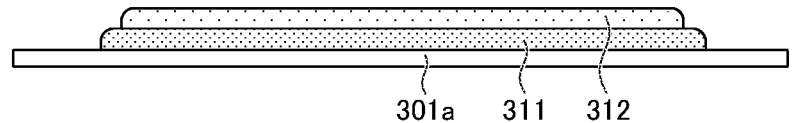

In the inspecting step S5, the width of the first positive electrode mixture layer 311 and the width of the second positive electrode mixture layer 312 on the positive electrode foil 301a are measured by the inspecting device 250. Specifically, as shown in FIG. 11, the inspecting device 250 includes a color-difference meter 251 and a lighting unit 252 that are disposed at a predetermined distance from the positive electrode foil 301a. The lighting unit 252 includes, for example, a halogen lamp and the like and irradiates the positive electrode foil 301a with light in a substantially perpendicular direction. The lighting unit 252 may be provided separately from the color-difference meter 251 or may be included in the color-difference meter 251.

The color-difference meter 251 detects light that is emitted from the lighting unit 252 and reflected on the positive electrode foil 301a, the first positive electrode mixture layer 311, and the second positive electrode mixture layer 312. In addition, the color-difference meter 251 converts a detected image into values in the L*a*b* color system for each pixel. It should be noted that although the resolution of the color-difference meter 251 is not particularly limited, the color-difference meter 251 detects, as a unit pixel, an area of 1 to 2 mm×1 to 2 mm on the surface of the positive electrode foil 301a, the first positive electrode mixture layer 311, and the second positive electrode mixture layer 312.

In the present embodiment, since the opposite ends of the first positive electrode mixture layer 311 in the width direction project outward beyond the opposite ends of the second positive electrode mixture layer 312 in the width direction, the light reflected on the opposite end portions of the first positive electrode mixture layer 311 in the width direction is received by the color-difference meter 251. Further, the first positive electrode mixture layer 311 has a smaller L* value in the L*a*b* color system as compared to the second positive electrode mixture layer 312. Since there is such a difference in the L* value (black color level) in the boundary portion between the positive electrode foil 301a and the first positive electrode mixture layer 311 and in the boundary portion between the first positive electrode mixture layer 311 and the second positive electrode mixture layer 312, the inspecting device 250 can detect the opposite end portions of the first positive electrode mixture layer 311 and the opposite end portions of the second positive electrode mixture layer 312. Thus, the width of the first positive electrode mixture layer 311 and the width of the second positive electrode mixture layer 312 can be measured simultaneously.

In addition, in the present embodiment, by forming the first positive electrode mixture layer 311 and the second positive electrode mixture layer 312 such that the difference between the L* value of the first positive electrode mixture layer 311 and the L* value of the second positive electrode mixture layer 312 is 4 or larger, the boundary portion between the first positive electrode mixture layer 311 and the second positive electrode mixture layer 312 has an efficiently large difference in the L* value. Thus, the end portions of the second positive electrode mixture layer 312 can be precisely detected. It should be noted that in an experiment conducted by the inventor of the present application, in the first positive electrode mixture layer 311, which was formed by adding 8 parts by weight of scaly graphite and 5 parts by weight of powdered carbon particles to 100 parts by weight of lithium nickel manganese oxide, the L* value had a dispersion 36 (i.e., three times of the standard deviation) of less than 2, and the L* value was 14 to 15. Meanwhile, in the second positive electrode mixture layer 312, which was formed by adding 7 parts by weight of scaly graphite and 3 parts by weight of powdered carbon particles to 100 parts by weight of lithium nickel manganese oxide, the L* value had a dispersion 36 of less than 2, and the L* value was 24 to 26. Since the L* value of the first positive electrode mixture layer 311 and the L* value of the second positive electrode mixture layer 312 both have a dispersion 36 of less than 2, the boundary between the first positive electrode mixture layer 311 and the second positive electrode mixture layer 312 can be detected as long as the difference between the L* value of the first positive electrode mixture layer 311 and the L* value of the second positive electrode mixture layer 312 is 4 or larger.

In addition, in the present embodiment, since the positive electrode foil 301a is made of an aluminum foil, the positive electrode foil 301a has a larger L* value as compared to the first positive electrode mixture layer 311 and the second positive electrode mixture layer 312. Further, since the first positive electrode mixture layer 311 is formed to have a smaller L* value as compared to the second positive electrode mixture layer 312, there is a large difference between the L* value of the positive electrode foil 301a and the L* value of the first positive electrode mixture layer 311. With such a configuration, it is possible to easily and precisely detect the boundary between the positive electrode foil 301a and the first positive electrode mixture layer 311, and thus it is possible to easily and precisely detect the width of the first positive electrode mixture layer 311.

After passing through the inspecting device 250, the positive electrode foil 301a is conveyed to the winding roller 204 and wound by the winding roller 204. The roll wound by the winding roller 204 is placed on the feed roller 201 in a state where the coated surface is reversed, and then the above-described coating step S3, drying step S4, and inspecting step S5 are performed again. In this way, the first positive electrode mixture layers 311 and the second positive electrode mixture layers 312 are formed on the opposite surfaces of the positive electrode foil 301a.

Next, in the pressing step S6, the positive electrode foil 301a having the first positive electrode mixture layers 311 and the second positive electrode mixture layers 312 formed on the opposite surfaces thereof is passed between a pair of rollers of a roll press (not shown). The rollers are heated to a temperature of 60° C. to 120° C., and the first positive electrode mixture layers 311 and the second positive electrode mixture layers 312 formed on the opposite surfaces of the positive electrode foil 301a are heated and compressed. Then, a laminate of the second positive electrode mixture layer 312, the first positive electrode mixture layer 311, the positive electrode foil 301a, the first positive electrode mixture layer 311, and the second positive electrode mixture layer 312 is formed to have a thickness of 50 µm to 100 µm, for example.

In the cutting step S7, the positive electrode foil 301a having the first positive electrode mixture layers 311 and the second positive electrode mixture layers 312 formed on the opposite surfaces thereof is cut at its center in the width direction, whereby the positive electrode body 301 shown in FIG. 5 can be obtained.

It should be noted that although an example of measuring the width of the first positive electrode mixture layer 311 and the width of the second positive electrode mixture layer 312 before the cutting step S7 as shown in FIG. 10 has been described, it is also possible to measure the width of the first positive electrode mixture layer 311 and the width of the second positive electrode mixture layer 312 after the cutting step S7 as shown in FIG. 5. In the cutting step S7, the end portion of the first positive electrode mixture layer 311 on the other side in the width direction is formed so as to be flush with the second positive electrode mixture layer 312 and the positive electrode foil 301a. Meanwhile, the end portion of the first positive electrode mixture layer 311 on the one side in the width direction is formed so as to project beyond the second positive electrode mixture layer 312 toward the one side in the width direction. This means that the width of the first positive electrode mixture layer 311 is equal to the distance from the end portion of the first positive electrode mixture layer 311 on the one side to the end portion of the second positive electrode mixture layer 312 on the other side, as described above. Thus, with the inspecting device 250, the width of the first positive electrode mixture layer 311 can be measured by detecting the end portion of the first positive electrode mixture layer 311 on the one side and the end portion of the second positive electrode mixture layer 312 on the other side.

The step of preparing the negative electrode body 302 is a simplified step of preparing the positive electrode body 301. Specifically, the step of preparing the negative electrode body 302 includes a slurry preparing step, a coating step S3, a drying step S4, an inspecting step S5, a pressing step S6, and a cutting step S7.

In the slurry preparing step, a negative electrode mixture slurry, which will form the negative electrode mixture layer 302b, is prepared by a negative electrode active material, a binder, and a dispersing solvent. Although the materials of the negative electrode active material, the binder, and the dispersing solvent are not particularly limited, for example, 10 parts by weight of PVDF as a binder is added to 100 parts by weight of amorphous carbon powder as a negative electrode active material, and then NMP as a dispersing solvent is further added thereto and kneaded to prepare the negative electrode mixture slurry.

It should be noted that other than the amorphous carbon, examples of the negative electrode active material may include natural graphite into/from which lithium ions can be insert/removed, or various artificial graphite materials, carbon particles such as coke, or a compound of Si or Sn, and the like (for example, SiO, $TiSi_2$, and the like), or a composite material of them. Examples of the particle form of the negative electrode active material may include, but are not particularly limited to, a scaly form, a spherical form, a fibrous form, a massive form, or the like.

In addition, when various types of graphite are used as the negative electrode active material, water can be selected as a dispersing solvent, which can reduce environmental loads. Examples of the water-based negative electrode slurry may include a negative electrode mixture slurry prepared by adding 1 part by weight of styrene butadiene rubber as a binder and 1 part by weight of sodium carboxymethylcellulose as a thickener to 100 parts by weight of natural graphite powder.

It should be noted that although an example using PVDF as a binder when preparing the negative electrode body 302 and the positive electrode body 301 has been shown, examples of the binder may include a polymer, a mixture, and the like of polytetrafluoroethylene (PTFE), polyethylene, polystyrene, polybutadiene, butyl rubber, nitrile rubber, styrene butadiene rubber, polysulfide rubber, nitrocellulose, cyanoethyl cellulose, various kinds of latex, acrylonitrile, vinyl fluoride, vinylidene fluoride, propylene fluoride, chloroprene fluoride, acrylic-based resin, and the like.

The coating step S3, the drying step S4, and the inspecting step S5 are performed by using the coating/drying apparatus 200 in the same manner as the above-described step of preparing the positive electrode body 301.

In this coating step S3, however, only one type of negative electrode mixture slurry is applied. Thus, a die head provided with only one ejection port is used. In the coating step S3, the negative electrode mixture slurry is applied over the negative electrode foil 302a.

In the drying step S4, the negative electrode foil 302a and the negative electrode mixture slurry layer pass through the inside of the drying furnace 203, whereby the negative electrode mixture slurry layer is heated and dried to form the negative electrode mixture layer 302b.

In the inspecting step S5, the width of the negative electrode mixture layer 302b on the negative electrode foil 302a is measured by the inspecting device 250.

After passing through the inspecting device 250, the negative electrode foil 302a is conveyed to the winding roller 204 and wound by the winding roller 204. The roll wound by the winding roller 204 is placed on the feed roller 201 in a state where the coated surface is reversed, and then the above-described coating step S3, drying step S4, and inspecting step S5 are performed again. In this way, the negative electrode mixture layers 302b are formed on the opposite surfaces of the negative electrode foil 302a.

Thereafter, in the same manner as the step of preparing the positive electrode body 301, the pressing step S6 and the cutting step S7 are performed, whereby the negative electrode body 302 shown in FIG. 4 can be obtained.

In the present embodiment, as described above, the width of the first positive electrode mixture layer 311 is greater than the width of the second positive electrode mixture layer 312. This allows the color-difference meter 251 to detect the light reflected on the opposite end portions of the first positive electrode mixture layer 311 in the width direction and the light reflected on the opposite end portions of the second positive electrode mixture layer 312 in the width direction simultaneously. In addition, the first positive electrode mixture layer 311 and the second positive electrode mixture layer 312 have different contents of carbon particles and different L* values in the L*a*b* color system. Since there is such a difference in the L* value in the boundary portion between the positive electrode foil 301a and the first positive electrode mixture layer 311 and in the boundary portion between the first positive electrode mixture layer 311 and the second positive electrode mixture layer 312, the inspecting device 250 including the color-difference meter 251 can detect the end portion of the first positive electrode mixture layer 311 on the one side and the end portion of the second positive electrode mixture layer 312 on the other side, as well as the opposite end portions of the second positive electrode mixture layer 312. Thus, the width of the first positive electrode mixture layer 311 and the width of the second positive electrode mixture layer 312 can be measured simultaneously. Consequently, it is possible to reduce the likelihood that the manufacturing process of the positive electrode body 301 becomes complicated.

In addition, as described above, the positive electrode mixture layer 301b of the positive electrode body 301 is configured to have a two-layer structure including the first positive electrode mixture layer 311 and the second positive electrode mixture layer 312, and the first positive electrode mixture layer 311 and the second positive electrode mixture layer 312 are formed such that their L* values differ from each other by 4 or larger. In the positive electrode body 301, even if the first positive electrode mixture layer 311 and the second positive electrode mixture layer 312 are configured to have different contents of carbon particles so that their L* values differ from each other by 4 or larger, it is possible to allow the positive electrode body 301 to easily exhibit its required performance. Therefore, the electrode for a secondary battery of the present invention can easily be applied to the positive electrode body 301.

It should be noted that the present invention is not limited to the aforementioned embodiment, and includes a variety of modifications. For example, although the aforementioned embodiment has been described in detail to clearly illustrate the present invention, the present invention need not include all of the structures described in the embodiment. It is possible to replace a part of a structure of an embodiment with a structure of another embodiment. In addition, it is also possible to add, to a structure of an embodiment, a structure of another embodiment. Further, it is also possible to, for a part of a structure of each embodiment, add, remove, or substitute a structure of another embodiment.

For example, although the aforementioned embodiment shows an example using the same die head 210 to apply the first positive electrode mixture slurry 311a and the second positive electrode mixture slurry 312a simultaneously, the present invention is not limited thereto. For example, a separate die head for applying the second positive electrode mixture slurry 312a may be provided downstream of the die head for applying the first positive electrode mixture slurry 311a in the conveying direction (arrow D direction), so as to first apply the first positive electrode mixture slurry 311a, and then apply the second positive electrode mixture slurry 312a. Then, after the step of drying the first positive electrode mixture slurry 311a and the second positive electrode mixture slurry 312a, the width of the first positive electrode mixture layer 311 and the width of the second positive electrode mixture layer 312 may be measured simultaneously.

In addition, although the aforementioned embodiment shows an example in which the L* value of the first positive electrode mixture layer 311 is smaller than the L* value of the second positive electrode mixture layer 312, the present invention is not limited thereto. The L* value of the first positive electrode mixture layer 311 may be larger than the L* value of the second positive electrode mixture layer 312. In this case as well, since there is a difference in the L* value (black color level) in the boundary portion between the positive electrode foil 301a and the first positive electrode mixture layer 311 and in the boundary portion between the first positive electrode mixture layer 311 and the second positive electrode mixture layer 312, the width of the first positive electrode mixture layer 311 and the width of the second positive electrode mixture layer 312 can be measured simultaneously.

In addition, although the aforementioned embodiment shows an example in which the first positive electrode mixture layer 311 and the second positive electrode mixture layer 312 have different contents of carbon particles and different average particle diameters of carbon particles so that their L* values differ from each other, the present invention is not limited thereto. For example, even when only the average particle diameter of carbon particles of the first positive electrode mixture layer 311 is smaller (or larger) than the average particle diameter of carbon particles of the second positive electrode mixture layer 312, the L* value of the first positive electrode mixture layer 311 becomes smaller (or larger) than the L* value of the of the second positive electrode mixture layer 312.

In addition, although the aforementioned embodiment shows an example in which the first positive electrode mixture layer 311 has a different content of carbon particles and the second positive electrode mixture layer 312 has a different average particle diameter of carbon particles, the present invention is not limited thereto. For example, the content of carbon particles of the first positive electrode mixture layer 311 may be higher (or lower) than the content of carbon particles of the second positive electrode mixture layer 312 and the thickness of the first positive electrode mixture layer 311 may be larger (or smaller) than the thickness of the second positive electrode mixture layer 312. When the thickness of the first positive electrode mixture layer 311 is larger (or smaller) than the thickness of the second positive electrode mixture layer 312, the amount of light absorption of the first positive electrode mixture layer 311 becomes larger (or smaller) than the amount of light absorption of the second positive electrode mixture layer 312. Thus, the L* value of the first positive electrode mixture layer 311 becomes smaller (or larger) than the L* value of the of the second positive electrode mixture layer 312.

In addition, the aforementioned embodiment shows an example of irradiating the positive electrode foil 301a with light from the lighting unit 252 in a substantially perpendicular direction, detecting the light reflected on the positive electrode foil 301a, the first positive electrode mixture layer 311, and the second positive electrode mixture layer 312 by the color-difference meter 251, and measuring the width of the first positive electrode mixture layer 311 and the width of the second positive electrode mixture layer 312 by using the L* value (black color level). In this method, the first positive electrode mixture layer 311 and the second positive electrode mixture layer 312 are configured such that their L* values differ from each other. However, the present invention is not limited thereto. Even when the first positive electrode mixture layer 311 and the second positive electrode mixture layer 312 have the same L* value, the width of the first positive electrode mixture layer 311 and the width of the second positive electrode mixture layer 312 can be measured simultaneously.

Figure 12:
FIG. 12 is a schematic view around an inspecting device according to a modification of the present invention.
Figure 12:
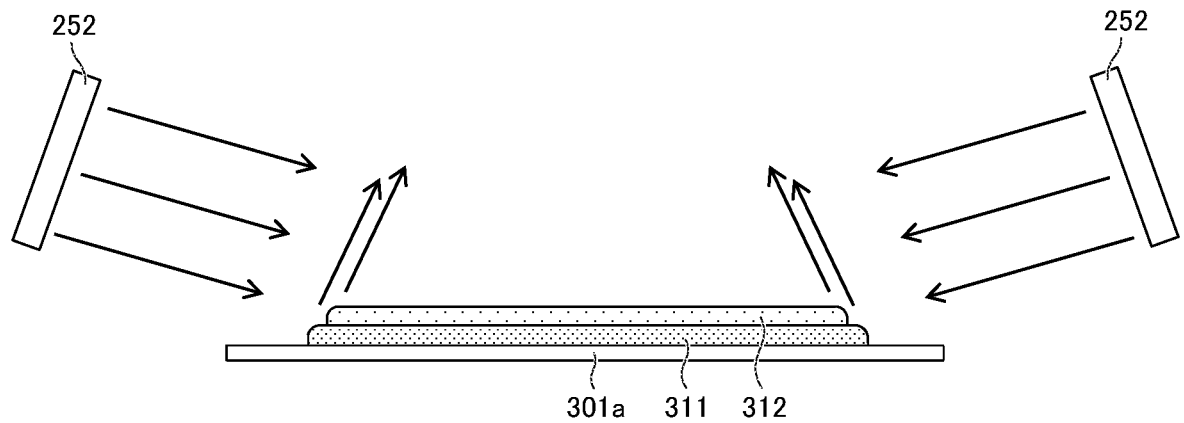

Specifically, like the inspecting device 250 according to a modification of the present invention shown in FIG. 12, the lighting units 252 are disposed on the opposite sides in the width direction to irradiate the positive electrode foil 301a with light in oblique directions. Examples of such a lighting unit 252 may include a ring lighting unit, a bar lighting unit, and the like. Irradiating the positive electrode foil 301a with light in the oblique directions makes the whole inspection area dark (this may also be referred to as dark field inspection). However, a scattering of the light reflected on the end portion of the first positive electrode mixture layer 311 and the end portion of the second positive electrode mixture layer 312 makes only the end portion of the first positive electrode mixture layer 311 and the end portion of the second positive electrode mixture layer 312 appear bright. By detecting such light with the color-difference meter 251, the width of the first positive electrode mixture layer 311 and the width of the second positive electrode mixture layer 312 can be measured simultaneously. This method may not use the color-difference meter 251, and may perform binarization on the detected light so that the end portion of the first positive electrode mixture layer 311 and the end portion of the second positive electrode mixture layer 312 can be detected.

In addition, although the aforementioned embodiment shows an example using the electrode for a secondary battery of the present invention for the positive electrode body 301, the present invention is not limited thereto. The electrode for a secondary battery of the present invention may be used for the negative electrode body 302. However, when the negative electrode mixture layer 302b is configured to have a two-layer structure including the first negative electrode mixture layer and the second negative electrode mixture layer, the first negative electrode mixture layer and the second negative electrode mixture layer are less likely to have a large difference in the L* value since the negative electrode mixture layer 302b of the negative electrode body 302 includes a large amount of amorphous carbon powder, that is, black granular material. For this reason, the measurement may appropriately be performed using the method shown in FIG. 12 when the electrode for a secondary battery of the present invention is used for the negative electrode body 302.

In addition, although the aforementioned embodiment shows an example using, as an electrode for a secondary battery, the one in which the end portion of the first positive electrode mixture layer 311 on the other side is formed so as to be flush with the second positive electrode mixture layer 312 and the positive electrode foil 301a and the end portion of the first positive electrode mixture layer 311 on the one side is formed so as to project beyond the second positive electrode mixture layer 312 toward the one side in the width direction, the present invention is not limited thereto. The one in which the opposite ends of the first positive electrode mixture slurry layer 311b in the width direction are formed so as to project outward beyond the opposite ends of the second positive electrode mixture slurry layer 312b in the width direction may be used as an electrode for a secondary battery.

In addition, although the aforementioned embodiment shows an example of winding the positive electrode body 301 and the negative electrode body 302 with the separator 303 interposed therebetween, the present invention is not limited thereto. The present invention can also be applied to a secondary battery in which the positive electrode bodies 301 and the negative electrode bodies 302 are alternately stacked one on top of the other with the separators 303 interposed therebetween.

In addition, although the aforementioned embodiment describes the case where the first positive electrode mixture layer 311 and the second positive electrode mixture layer 312 have characteristics that are different from each other, the present invention is not limited thereto. For example, the first positive electrode mixture layer 311 and the second positive electrode mixture layer 312 may be configured to have the same components and composition ratio and may have the same characteristics. In this case, since the method using a difference in the L* value cannot measure the width of the first negative electrode mixture layer and the width of the second negative electrode mixture layer simultaneously, the measurement may be performed using the method shown in FIG. 12.

REFERENCE SIGNS LIST

20 Rectangular secondary battery (secondary battery)
301 Positive electrode body (electrode for secondary battery)
301a Positive electrode foil (metal foil)
301b Positive electrode mixture layer (mixture layer)
311 First positive electrode mixture layer (first mixture layer)
311a First positive electrode mixture slurry (first mixture slurry)
311b First positive electrode mixture slurry layer (first mixture slurry layer)
312 Second positive electrode mixture layer (second mixture layer)
312a Second positive electrode mixture slurry (second mixture slurry)
312b Second positive electrode mixture slurry layer (second mixture slurry layer)

The invention claimed is:

1. An electrode for a secondary battery comprising:
a strip-like metal foil; and
a mixture layer provided on the strip-like metal foil, wherein:
the mixture layer includes a first mixture layer provided on the strip-like metal foil and a second mixture layer provided on the first mixture layer,
the first mixture layer has a width greater than a width of the second mixture layer,
the first mixture layer and the second mixture layer contain carbon particles,
a content of the carbon particles of the first mixture layer is higher than a content of the carbon particles of the second mixture layer, and
the first mixture layer has a smaller L* value in a L*a*b* color system by 4 or larger as compared to the second mixture layer.

2. The electrode for a secondary battery according to claim 1, wherein an average particle diameter of the carbon particles of the first mixture layer is smaller than an average particle diameter of the carbon particles of the second mixture layer.

3. A secondary battery comprising the electrode for a secondary battery according to claim 1 as a positive electrode.

\* \* \* \* \*